United States Patent Office 3,437,615
Patented Apr. 8, 1969

3,437,615
WATER SOLUBLE ADDUCT OF A POLYESTER AND AN ETHOXYLATED FATTY COMPOUND
Richard C. Hanson, Hopkins, Minn., assignor to Ashland Oil & Refining Company, Ashland, Ky., a corporation of Kentucky
No Drawing. Filed Sept. 20, 1967, Ser. No. 669,299
Int. Cl. C08g 39/00, 37/24
U.S. Cl. 260—21                    7 Claims

ABSTRACT OF THE DISCLOSURE

Water soluble adduct of an alkyd resin and a polyoxyalkylene compound wherein the alkyd resin is the reaction product of a drying oil, a polyhydric alcohol, a polyoxyethylene glycol, a nonoxidizing monobasic carboxylic acid, and a dicarboxylic acid or anhydride and the polyoxyalkylene compound is the condensation product of a straight chain monohydroxy primary alcohol of 12–20 carbon atoms and a mixture of ethylene oxide and propylene oxide such that the product has 12–20 oxyalkylene groups in a ratio of 2:1 to 4.5:1 oxyethylene:oxypropylene groups. Optionally an amino resin, such as ureaformaldehyde or melamine-formaldehyde may be included to cross-link the adduct. The product is useful as a textile finishing agent.

---

This invention relates to the preparation of water soluble adducts of alkyd resins and ethoxylated fatty compounds and to the uses of such compounds as textile finishing agents.

In the preparation of textiles it has become increasingly important in recent years to provide modifiers of all sorts which will cause the textile to have characteristics and properties required for a specific end use. In some applications it is important to provide a nonwoven fabric with a finishing agent which will help to bind the nonwoven fiber into a dimensionally stable fabric. In another application it is desirable that a particular fabric be softened so that its normal harsh feel is eliminated and the fabric can be used in applications from which it was normally excluded. In still another instance the fabric may not have the desired pleasing appearance because it does not have an attractive draping characteristic which can be provided by applying a treating agent to the textile.

It is one aspect of this invention to provide a novel resin composition which is water-soluble and which will function as a highly desirable textile softener. It is another aspect of this invention to provide such a modifying agent having an improved durability to laundering. In another aspect this invention provides a modifier which is particularly desirable for use on polyester fabrics.

The resin composition of this invention is water-soluble and comprises 25–75% by weight of alkyd resin (A), 75%–25% by weight of a mixture of polyoxyalkylene compounds (B), and 0–25% by weight of an amino resin (C); said alkyd resin (A) consisting essentially of the following ingredients and their proportions by weight:

| | Percent |
|---|---|
| Drying oil | 20–45 |
| Polyhydric alcohol containing 2–6 hydroxyl groups/molecule | 15–40 |
| Polyoxyethylene glycol having a molecular weight from 600 to 6000 | 5–15 |
| Nonoxidizing, monobasic carboxylic acid, having 6 to 18 carbon atoms per molecule | 10–25 |
| Dicarboxylic acid or anhydride having 4 to 10 carbon atoms per molecule | 20–35 | and sufficient neutralizing agent to render said alkyd resin water-dispersible; and said mixture of polyoxyalkylene compounds (B) consisting essentially of polyoxyalkylene compounds each having a heteric polyoxyalkylene chain of randomly distributed oxyethylene and oxypropylene groups attached to the residue of a straight-chain monohydroxy primary alcohol at the site of its reactive hydrogen atom, said chain having 12 to 20 oxyalkylene groups with the ratio of said oxyethylene to oxypropylene groups being 2:1 to 4.5:1, said alcohol having 12 to 20 carbon atoms per molecule.

In a preferred embodiment of this invention the resin composition is one in which alkyd resin (A) is a polyalkylene glycol modified drying oil which consists essentially of the following ingredients and their proportions by weight:

| | Percent |
|---|---|
| Safflower oil | 25–35 |
| Pentaerythritol | 15–30 |
| Polyoxyethylene glycol (M.W.=2700–3200) | 6–12 |
| A benzoic acid | 10–20 |
| Phthalic acids | 20–30 | and sufficient neutralizing agent to render said alkyd resin water-dispersible.

In still another preferred embodiment of this invention the mixture of polyoxyalkylene compounds (B) is one in which the polyoxyalkylene chains have 14–16 oxyalkylene groups in a proportion of oxyethylene:oxypropylene groups ranging from 2:1 to 3.5:1 and in which the monohydroxy alcohol is derived from tallow and is a mixture of $C_{14}$, $C_{16}$, and $C_{18}$ fatty alcohols.

The alkyd resin which comprises the major portion of the resin composition of this invention has several components as described above; namely a drying oil, a polyhydric alcohol, a polyoxyethylene glycol, a nonoxidizing monobasic carboxylic acid, and a dicarboxylic acid or anhydride.

The drying oils which are employed in the alkyd resin component of this invention include any of the natural glyceride oils normally employed in the manufacture of alkyd resins. The term "drying oil" is used herein as meaning unsaturated triglycerides of fatty acids generally having 10 to 24 carbon atoms per molecule and as inclusive of what are known in the art as semi-drying and drying oils. Suitable drying oils which can be used for this purpose representatively include vegetable oils such as cottonseed oil, corn oil, soybean oil, safflower oil, tung oil, tunflower oil, oiticica oil, rapeseed oil, linseed oil, perilla oil, poppyseed oil, tall oil, dehydrated castor oil, blown castor oil, etc., and fish oils such as herring oil, menhaden oil, codfish oil, whale oil, and the like, including mixtures thereof. The preferred oil for reasons of convenience in supply and because of the quality provided to the final product is safflower oil or soybean oil. The amount of the oil which is employed in this invention can vary from about 20% to about 45% by weight of the alkyd resin product, but preferably it is present in the range of about 25-35%, most desirably 20-30%. The term "drying oil" also includes the esters of unsaturated fatty acids having 10 to 24 carbon atoms and such triols as trimethylol ethane, trimethylol propane, and the like, where the mole ratio of fatty acid-to-triol is 3:1. It is to be understood that in the preparation of the alkyd resin the drying oil may itself be employed, or alternatively its fatty acid and triol (including glycerine) ester-forming precursors may be used to form the ester in situ. Moreover, the drying oil component can comprise a mixture of various drying oils.

The polyhydric alcohol which is employed as an ingredient in making the drying oil-modified lkyd resin is one which contains at least two but not more than six hydroxyl groups in a molecule and has from two to eight carbon atoms. Typical examples of such a polyhydric alcohol include ethylene glycol, diethylene glycol, glycerine, trimethylol ethane, trimethylol propane, pentaerythritol, dipentaerythritol, sorbitol, amnitol, and similar polyhydric alcohols which can be employed in the preparation of alkyd resins. Mixtures of these polyhydric alcohols can be used. Pentaerythritol is preferred because it not only enhances the drying properties of the dispersion of the neutralized resin but also when used will enable the dispersion to have a high nonvolatile content and yet a desirable, workable viscosity, and paints made from such dispersion will have a desirable working consistency. The amount of polyhydric alcohol is 15-40% of the total solids, 15-30% being preferred and 18-28% being most desirable.

The polyoxyethylene glycol component of the alkyd resin is a compound having a long chain of repeating oxyethylene groups and a hydroxyl group at each end of the chain. This material has also been called a polyethylene glycol or a polyether glycol. It should have an average molecular weight which is from about 600 to about 6000, preferably 2700-3000. (This molecular weight is determined by the use of a phthalic anhydride-pyridine reagent as described in "Carbowax" Polyethylene Glycols, published by Union Carbide Co., p. 50, (1958) ). The amount of polyoxyethylene glycol which is employed is from about 5% to about 15% by weight of the total final product. Preferably the amount of polyoxyethylene glycol is 6-12% of the total solids.

The nonoxidizing, monobasic carboxylic acid which is employed in this invention is one which has from about 6 to about 18 carbon atoms per molecule, and is intended to include the saturated aliphatic acids, the saturated cycloaliphatic acids, and the aromatic acids. Typical examples of the types of acids included are isodecanoic, isooctanoic, cyclohexanoic, cyclopentanoic, benzoic, p-tertiary butyl benzoic acids, and the long chain fatty acids derived from materials such as cocoanut oils, palm kernel oil, babassu oil, and others known to those skilled in the are. Mixtures of these acids can also be used. The preferred materials for this component are benzoic acid and p-tertiary butyl benzoic acid. The amount of these acids which is employed in the process of this invention is from about 10% to about 25% preferably 10-20%, by weight of the total alkyd resin product. The nonoxidizing, monobasic carboxylic acid is an essential resin-forming component in this invention and it contributes to the hardness of the cured alkyd resin, thus the tack-free time of the films of the resin is shorter.

The dicarboxylic acid or anhydride which is a component of the alkyd resin employed in this invention has 4 to 10 carbon atoms per molecule and includes the aliphatic, cycloaliphatic, and aromatic dicarboxylic acids, and their anhydrides. Specific compounds which are included in this group of materials are terephthalic, isophthalic, adipic, glutaric, azelaic, and phthalic acids and anhydrides. The amount of this component which is employed varies from about 20% to about 35%, preferably 20-30%, by weight of the final alkyd resin product.

It is particularly preferred in this invention to employ isophthalic acid as the dicarboxylic acid or anhydride. The resins which are made employing isophthalic acid have a much greater resistance in the dispersed phase to hydrolytic cleavage than do resins made with the corresponding phthalic derivatives.

In the preparation of the alkyd resin during the reaction of the resin-forming ingredients, a nitrogen blanket can be used to produce an alkyd resin of good color. Also, during such reaction, an azeotropic solvent can be used to facilitate removal of by-product water. This use of solvent is conventional in alkyd preparations, the typical solvent used being xylene. Where residual amounts of such solvent cannot be tolerated water miscible, inert solvents can be used, e.g. various ethers and ether esters of ethylene glycol and diethylene glycol, such as Cellosolve acetate, diethyl Carbitol, dibutyl Carbitol, methyl Cellosolve acetate, Carbitol acetate, butyl Cellosolve acetate, and the like. In order to facilitate the esterification and transesterification reactions in the process, suitable alcoholysis catalysts are used, such as cobalt naphthenates, litharge, and the like, preferably lithium hydroxide.

The neutralization of the alkyd resin can be accomplished by adding a small amount of a neutralizing agent to neutralize a portion or all of the remaining acid groups in the resin. Generally, the amount of neutralizing agent used will be that sufficient to neutralize 20 to 150%, preferably 50 to 90%, of the theoretical acid groups in the resin. The resin is then dispersed at any desired viscosity in water to provide a water dispersion containing 5 to 55 weight percent resin solids (nonvolatile).

Useful neutralizing agents which can be used include ammonia, ammonium hydroxide, and primary, secondary and tertiary mono- or polyamines, including hydroxyamines, and especially the lower alkylamines, such as ethylamine, butylamine, dimethyl amine, diethyl amine, tributyl amine, triethyl amine, triisopropanolamine, ethanolamine, dimethylethanolamine, butanolamine, and the like. Amines which are volatile at temperatures below 350° F., preferably below about 250° F., are preferred. The amines can be added in undiluted form to give essentially anhydrous neutralized resin products, which products will be capable of practically unlimited dilution or dispersion in water without being coagulated. Alternatively, the resins can be neutralized by adding them to dilute aqueous solutions of water dispersible amines. Inorganic neutralizing agents, such as potassium or sodium hydroxide or carbonates can also be used. Mixtures of neutralizing agents can also be used.

In the preferred embodiment of the stepwise resin forming process, the first step of the reaction is accomplished by mixing safflower oil, pentaerythritol, a polyoxyethylene glycol such as "Carbowax 4000" having a molecular weight of about 2700 to 3200, and benzoic acid or p-tertiarybutyl benzoic acid. The amount of safflower oil is 20 to 30% of the total weight of material added in the process. These materials are reacted under a nitrogen blanket at atmospheric pressure and a temperature of 460° to 480° F. until the acid value of the material reaches a level of 0 to 25. This product is then esterified further by the addition of the remaining pentaerythritol and isophthalic acid (which optionally can be a mixture of isophthalic acid and phthalic anhydride), and heating the mixture under nitrogen at a temperature of 420° to 480° F. and at atmospheric pressure until the product has an acid value of 9 to 15. The material is then neutralized at 180° to 200° F. with triethylamine in an amount sufficient to neutralize 60 to 100%, preferably 80 to 90%, of the theoretical remaining acid groups in the product (based on the charge). This partially neutralized resin is then dispersed in water at about 130° to 180° F., preferably 140° to 150° F., to produce a water-dispersed resin having a high degree of resistance to hydrolysis.

The mixture of polyoxyalkylene compounds, which is component (B) of the resin composition of this invention, is a mixed condensation product of (1) an aliphatic straight-chain monohydroxy primary alcohol having 12-20 carbon atoms per molecule and (2) a mixture of ethylene oxide and propylene oxide to provide 12-20 oxyalkylene units randomly distributed in the chain in a ratio of 2:1 to 4.5:1, preferably 2:1 to 3.5:1, oxyethylene:oxypropylene groups. These mixed polyoxyalkylene products are generally prepared by condensing the alcohol with the mixture of oxides at a temperature of about 225-400° F. in the presence of an alkaline catalyst. The product is normally a clear liquid at some temperature in the range of 32-85° F.

The base material of the condensation product is a higher straight-chain aliphatic monohydric primary alcohol, preferably a fatty alcohol, having an average of 12 to 20 carbon atoms per molecule. Particularly useful commercially available alcohol products for this purpose are Adol 42, Adol 63, and Conoco 1618-S. A desirable product results from the condensation of one mole of such alcohol with 12-20 moles of a mixture of the alkylene oxides wherein the ratio of ethylene oxide to propylene oxide is 3/1. In the preferred aspect of this invention, the base material is a mixture of alcohols having 14 to 18 carbon atoms per molecule, e.g. a mixture (Adol 63) of alcohols derived from tallow, the mixture having an average composition of about 5% by weight of $C_{14}$ alcohol, about 30% by weight of $C_{16}$ alcohol, and about 65% by weight of $C_{18}$ alcohol. This mixture of tallow-derived alcohols can be hydrogenated or non-hydrogenated. Another base material which can be used is one prepared synthetically by the polymerization of ethylene, and having approximate composition, about 20% by weight of $C_{14}$ alcohol and about 40% by weight of each $C_{16}$ and $C_{18}$ alcohols. These base materials from two different sources can be employed to produce similar condensation products if there is an appropriate adjustment in the proportions of alkylene oxides employed in the process.

The foregoing alcohols are preferably natural alcohols, but it is not necessary that such be the case. The natural alcohols may be saturated or unsaturated or may be mixtures of saturated and unsaturated alcohols. Since the unsaturated alcohols result in a product of lower melting temperature, they may be preferred in certain applications. While it is possible to produce products of this invention by starting with a particular alcohol, it is preferable to employ a mixture of two or more alcohols, and the most desirable is to have a ternary mixture of the $C_{14}$, $C_{16}$ and $C_{18}$ alcohols.

The alkylene oxides employed in the process of this invention are ethylene oxide and 1,2-propylene oxide. It is necessary to use a combination of these two oxides in order to obtain the desired properties in the final product. If ethylene oxide is the only oxide used, the product is likely to be a water-soluble solid, and if propylene oxide is the only oxide used the product is likely to be a water-insoluble liquid or solid. Since neither of these combinations of properties is desired it is important to employ the aforementioned proportions of both oxides.

The total amount of alkylene oxides employed in this invention is from about 12 to about 20 moles of ethylene oxide plus propylene oxide per mole of alcohol. Less or more than these amounts will produce a product which does not have the desired surface activity, and less than these amounts will cause the product to be solid rather than liquid. An intermediate preferred range is from about 14 to about 16 moles to total alkylene oxides per mole of alcohol.

Within the above concentrations of moles of total alkylene oxides per mole of alcohol, it is important as has already been mentioned, to maintain certain concentration relationships between the ethylene oxide and the propylene oxide. This is because as the proportions of these two materials are varied, the final product changes from a water-insoluble liquid or solid to a water-soluble solid. In the broadest sense, the molar proportions of ethylene oxide to propylene oxide can vary from 2:1 to 4.5:1, depending on the composition and molecular weight of the reactant alcohol which is to be condensed with these oxides. If the alcohol has a higher proportion of $C_{14}$ materials, or if there is a certain amount of unsaturated alcohol in the reactant, the proportion of ethylene oxide to propylene oxide should be higher; and, if the alcohol has a higher proportion of $C_{18}$ materials, or has essentially no unsaturation, the proportion of ethylene oxide to propylene oxide should be lower. A preferred proportion for the natural and synthetic alcohols described above is from 2:1 to 3.5:1 moles of ethylene oxide per mole of propylene oxide. For many alcohol compositions, a proportion of 3:1 produces a very desirable product.

The optional component of this invention is an amino resin which performs the function of cross-linking the adduct of the alkyd resin (A) and the polyoxyalkylene compound (B). When it is necessary for the final product to have an increased durability to laundering or to function as a binder for nonwoven fabrics, the addition of the cross-linking amino resin is desirable. The best known and most readily available amino resins are the urea-formaldehyde resins and the melamine-formaldehyde resins, usually containing from 2-6 moles of formaldehyde for each mole of urea or melamine. Typical resins which may be employed for this portion of the final product are Rohm & Haas F200-E (urea-formaldehyde), Monsanto's Resimene 881 (melamine-formaldehyde resin), and Archer Daniels Midland's Arolon 9006 (melamine-formaldehyde resin). The proportion of the amino resin to be employed in the composition of this invention may range up to about 25% by weight of the adduct of the alkyd resin and the polyoxyalkylene compounds.

This invention may be more readily understood by reference to the following example in which parts and percentages are by weight and temperatures are in degrees Fahrenheit unless other wise indicated. It is not intended that these examples shall limit the invention in any way whatsoever since they are merely illustrative of certain embodiments of this invention.

Example 1

An alkyd resin is prepared from the following ingredients:

| | Parts by weight (approximate), percent |
|---|---|
| Safflower oil | 26 |
| Pentaerythritol (technical grade) | 15 |
| p-Tertiary-butyl benzoic acid | 18 |
| Polyoxyethylene glycol (M.W.=3000-4000 | 8 |
| Phthalic anhydride | 20 |
| Isophthalic acid | 7 |
| Pentaerythritol | 9 |

The first four ingredients above are charged into a flask fitted with thermometer, mechanical agitator, and a water trap to which is attached a reflux condenser. The temperature is raised to 460°-480° F. and maintained at that level until an acid value of 30 is obtained by testing the mixture. The resin is partially cooled and the last two ingredients are added. The reaction mixture is then maintained at about 430° F. until an acid value of 10-15 was obtained. The resin is then dispersed in water with triethylamine, yielding a white, opalescent dispersion having a pH of 7, and a nonvolatile content of 42%.

A mixture of polyoxyalkylene compounds was prepared by condensing a hydrogenated tallow alcohol with a mixture of ethylene oxide and propylene oxide. The tallow alcohol comprised (typical analysis) 1% $C_{12}$ alcohol, 4% $C_{14}$ alcohol, 32% $C_{16}$ alcohol, 62% $C_{18}$ alcohol, and 1% $C_{20}$ alcohol. The mixture of ethylene oxide and propylene oxide comprised 3 moles of ethylene oxide per mole of propylene oxide and the total condensing mixture was in the proportion of 1 mole of tallow alcohol per 10.5 moles of ethylene oxide per 3.5 moles of propylene oxide.

A blend was prepared by warming another batch of the alkyd resin described above after it had been further dispersed in water to the extent of 36% resin solids, and then mixing in a solution of 36% by weight of the above described polyoxyalkylene compounds in water and a small amount of an antifoaming agent. The temperature was maintained at 140° F. until the mixture was homogeneous.

This mixture was further diluted to about 10% non-volatile and applied as a textile finishing agent to pieces of 80 x 80 cotton cloth with the following results:

|  | No treatment | Resin composition of this example |
|---|---|---|
| Dry wt. add-on, percent | 0 | 11 |
| Hand description | (¹) | (¹) |
| Elmendorf tear strength ² | 1,600 | 2,480 |
| Flexibility, centimeters ³ | 4.4 | 4.0 |
| Resin retained after 10 washings, percent | | 41 |

¹ Very soft.
² Values are gram-cm. of work required to tear fabric. Warp and fill directions totaled.
³ Flexibility test was ASTM D 1388-55T drape stiffness method. The lower the value in cm. the more flexible (soft) the fabric.

Example 2

The blend of Example 1 was mixed with 25% by weight of a melamine-formaldehyde resin (ADMINO 9006) based on the blend solids. When the resulting product, diluted with water to about 8% non-volatile, was applied to fabrics, particularly polyester fabrics, there was an improvement in durability to laundering with only a slight sacrifice in softness as indicated by the following tabulation of test results.

|  | No treatment | | Resin composition of this example | |
|---|---|---|---|---|
|  | Cotton | "Dacron" polyester | Cotton | "Dacron" polyester |
| Dry wt. add-on, percent | 0 | 0 | 12 | 10 |
| Hand description | (¹) | (¹) | Soft | Soft |
| Tear strength | 1,600 | | 2,224 | |
| Flexibility | 4.4 | 3.4 | 4.8 | 6.0 |
| Resin Retained after 10 washings, percent | | | 60 | 76 |

¹ Very soft.

Example 3

The melamine modified blend of Example 2 was also applied to nonwoven fabric of cellulose, nylon, and polyester. The dry deposited weight of resin was 40–60% by weight based on the weight of the untreated fabric. In each instance the treated fabric had a medium-firm hand and good dimensional stability to repeated laundering.

Example 4

The blend of Example 1 was applied to a 65/35 "Dacron" polyester/cotton shirting fabric and tested for tear strength and abrasion resistance. As a comparison similar pieces of fabric were tested with the alkyd resin, alone (i.e., before being mixed with the polyalkylene compounds). In still another comparison the fabric was treated with a polyethylene emulsion. In all instances, the treating agents were used as 20% aqueous solutions containing about 5% of the treating agent or modifier, 2.5% of a magnesium chloride catalyst, and 12% of a commercial durable press resin (Permafresh 183; Sun Chemical Co.). The results are shown in the following tabulation.

|  | Alkyd resin of Ex. 1 | Blend of Ex. 1 | Polyethylene emulsion |
|---|---|---|---|
| Dry wt. add-on, percent (calculated) | 5 | 5 | 5 |
| Tear strength | 2,656 | 2,960 | 3,216 |
| Tear strength after 150 flat abrasion cycles | 2,176 | 2,560 | 3,120 |
| Abrasion rating | 3 | 2 | 1 |

Various modifications and alterations of this invention will become apparent to those skilled in the art without departing from the scope and spirit of this invention and it should be understood that this invention is not to be limited to the preferred embodiments set forth herein for illustrative purposes.

What is claimed is:

1. A water-soluble resin composition comprising 25–75% by weight of alkyd resin (A) 75–25% by weight of a mixture of polyoxyalkylene compounds (B), and 0–25% by weight of an amino resin (C); said alkyd resin (A) consisting essentially of the following ingredients and their proportions by weight:

| | Percent |
|---|---|
| Glyceride or ester drying oil | 20–45 |
| Polyhydric alcohol containing 2–6 hydroxyl groups/molecule | 15–40 |
| Polyoxyethylene glycol having a molecular weight from 600 to 6000 | 5–15 |
| Non-oxidizing, monobasic carboxylic acid, having 6 to 18 carbon atoms per molecule | 10–25 |
| Dicarboxylic acid or anhydride having 4 to 10 carbon atoms per molecule | 20–35 | and sufficient neutralizing agent to render said alkyd resin water-dispersible; and said mixture of polyoxyalkylene compounds (B) consisting essentially of polyoxyalkylene compounds each having a heteric polyoxyalkylene chain of randomly distributed oxyethylene and oxypropylene groups attached to the residue of a straight-chain monohydroxy primary alcohol at the site of its reactive hydrogen atom, said chain having 12 to 20 oxyalkylene groups with the ratio of said oxyethylene to oxypropylene groups being 2:1 to 4.5:1, said alcohol having 12 to 20 carbon atoms per molecule.

2. The composition of claim 1 wherein said alkyd resin (A) is a polyalkylene glycol modified drying oil consisting essentially of the following ingredients and their proportions by weight:

| | Percent |
|---|---|
| Safflower oil | 25–35 |
| Pentaerythritol | 15–30 |
| Polyoxyethylene glycol (M.W.=2700–3200) | 6–12 |
| A benzoic acid | 10–20 |
| Isophthalic acid | 20–30 | and sufficient neutralizing agent to render said alkyd resin water-dispersible.

3. The composition of claim 1 wherein said alkyd resin (A) is a polyalkylene glycol modified drying oil consisting essentially of the following ingredients and their proportions by weight:

| | Percent |
|---|---|
| Safflower oil | 20–30 |
| Pentaerythritol | 18–28 |
| Polyoxyethylene glycol (M.W.=2700–3200) | 5–15 |
| A benzoic acid | 15–25 |
| Isophthalic acid | 5–20 |
| Phthalic anhydride | 15–25 | and sufficient neutralizing agent to render said alkyd resin water-dispersible.

4. The composition of claim 1 wherein said mixture of polyoxyalkylene compounds (B) consists essentially of polyoxyalkylene compounds each having a heteric polyoxyalkylene chain of 14 to 16 oxyalkylene groups in a ratio of oxyethylene to oxypropylene groups of 2:1 to 3.5:1.

5. The composition of claim 4 wherein said chain has 16 oxyalkylene groups and the ratio of said oxyethylene to oxypropylene groups is 3:1 and wherein said alcohol is derived from tallow and is a mixture of fatty alcohols having 5–20% $C_{14}$ alcohol, 30–40% $C_{16}$ alcohol, and 40–65% $C_{18}$ alcohol.

6. The composition of claim 1 wherein said amino resin (C) is a urea-formaldehyde resin or a melamine-formaldehyde resin.

7. The composition of claim 1 compirsing 30–50% by weight of said alkyd resin (A), 30–50% by weight of said mixture of polyoxyalkylene compounds (B), and 15–25% by weight of said amino resin (C).

References Cited

UNITED STATES PATENTS

| | | | |
|---|---|---|---|
| 2,634,245 | 4/1953 | Arndt | 260—22 |
| 3,133,032 | 5/1964 | Jen et al. | 260—21 |
| 3,223,659 | 12/1965 | Curtice et al. | 260—22 |
| 3,280,057 | 10/1966 | Campagna | 260—21 |
| 3,379,548 | 4/1968 | Jen | 106—245 |

DONALD E. CZAJA, *Primary Examiner.*

R. W. GRIFFIN, *Assistant Examiner.*

U.S. Cl. X.R.

260—22, 29.2, 29.4, 32.4, 32.6, 33.2; 117—139.5